July 17, 1928.
F. B. ROBERTS ET AL
1,677,656
SORTING TABLE
Filed Feb. 12, 1927
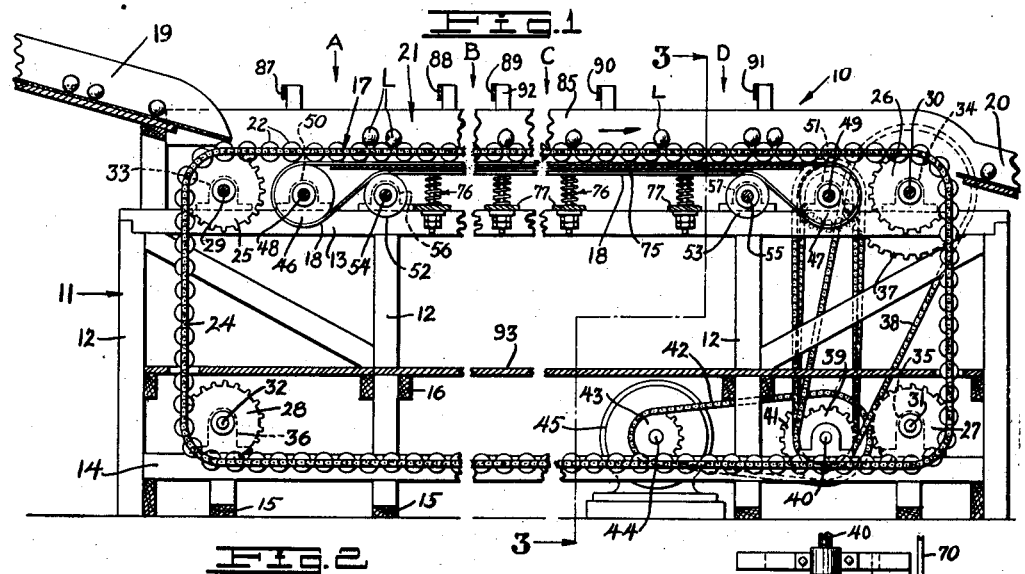
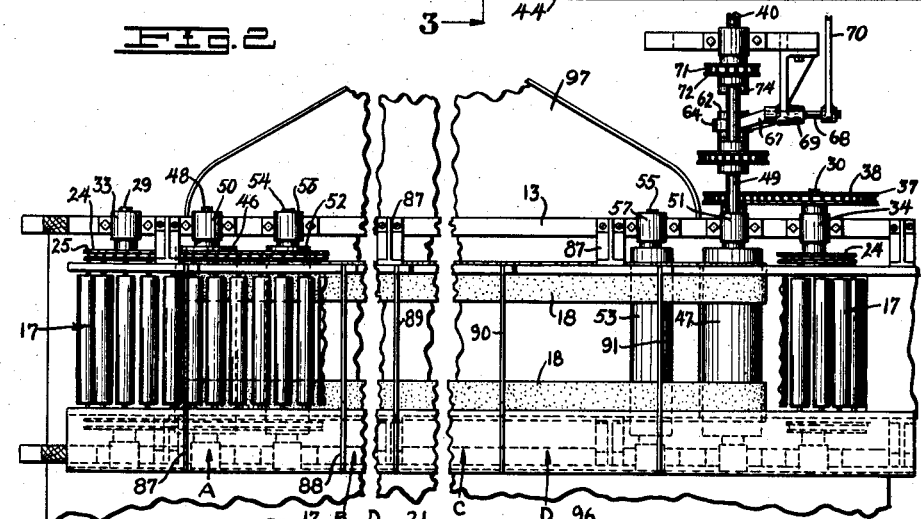
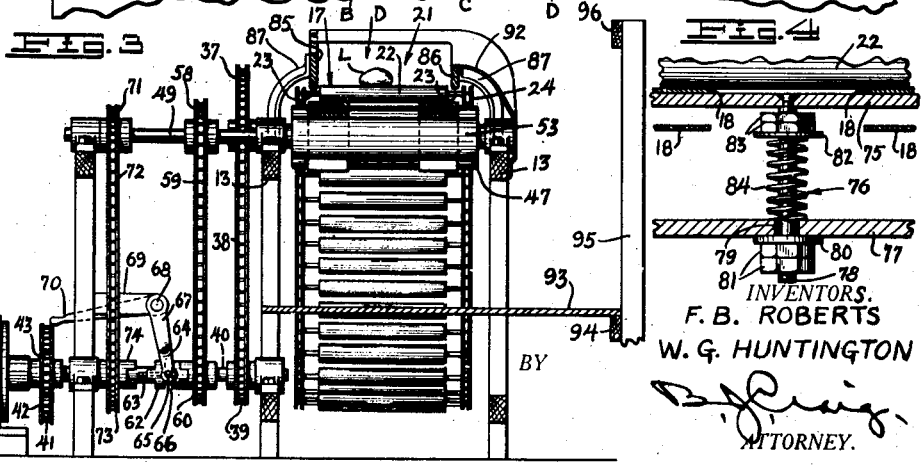
INVENTORS.
F. B. ROBERTS
W. G. HUNTINGTON
BY
ATTORNEY.

Patented July 17, 1928.

1,677,656

UNITED STATES PATENT OFFICE.

FRANK B. ROBERTS AND WILLIS G. HUNTINGTON, OF ANAHEIM, CALIFORNIA.

SORTING TABLE.

Application filed February 12, 1927. Serial No. 167,624.

This invention relates to fruit handling apparatus.

The general object of the invention is to provide an improved fruit grading apparatus, and the invention has to do with apparatus employed for grading of fruit relative to quality rather than to size or shape.

A specific object of the invention is to provide means to facilitate the operation of grading fruit by causing the fruit, while being conveyed, to turn, so that the operator may observe the entire surface of the fruit.

Another object of this invention is to provide means whereby the fruit as it is conveyed will be caused to make a desired movement in a predetermined length of travel.

Another object of this invention is to provide a fruit grader having an endless track for conveying the fruit, wherein the track includes rollers on which the fruit rests and wherein means is provided for revolving the rollers to cause the fruit to turn.

An additional object of the invention is to provide an endless belt conveyor device including rollers and means for revolving the rollers of the endless conveyor, wherein adjustable resilient means is provided for retaining the belt against the rollers to cause turning at all times.

Another object of this invention is to provide a conveyor having rollers thereon with means whereby the speed of the belt conveyor relative to the rollers may be altered.

Other objects and advantages of this invention will be apparent from the following description taken in connection with the accompanying drawings wherein:

Fig. 1 is a longitudinal section through a sorting table embodying the features of my invention and showing the relation of the various assembled parts.

Fig. 2 is a top plan view of the sorting table.

Fig. 3 is a section taken on line 3—3 of Fig. 1, and

Fig. 4 is an enlarged fragmentary view of one of the resilient plate supports.

The device shown and described in this application is particularly adapted for sorting lemons but it may also be used for sorting various other fruits or articles or may be used for other purposes.

Referring to the drawing by reference characters we have indicated our invention generally at 10 as comprising a supporting frame 11 composed of vertical standards 12, longitudinally extending side bars 13 and 14, and transverse members 15 and 16. This frame supports an endless conveyor 17, a roller turning belt 18, a loading chute 19, a discharge chute 20, and an inspection trough 21.

The conveyor 17 is shown as comprising rollers 22 mounted to rotate on shafts 23 and to be carried by sprocket chains 24. The sprocket chains 24 are shown as supported by sprockets 25, 26, 27, and 28, which are mounted on shafts 29, 30, 31, and 32 respectively. These shafts are supported in bearings 33, 34, 35, and 36. The bearings 33 and 34 are mounted on the upper bars 13 while the bearings 35 and 36 are mounted on the lower bars 14 of the frame 11.

The sprocket chains 24 of the roller conveyor are shown as driven in the direction of the arrow (see Fig. 1) by the sprockets 26 which are on the shaft 30. A sprocket 37 is secured adjacent one end of the shaft 30. This sprocket is adapted to be driven by a sprocket chain 38 from another sprocket 39 mounted on a shaft 40. For driving the shaft 40 we have shown a sprocket 41 mounted thereon and adapted to be driven by a sprocket chain 42 from another sprocket 43. The sprocket 43 is shown as adapted to be driven from the shaft 44 of a motor 45.

The belts 18 are provided for turning the rollers 22 about their respective axes as the conveyor 17 travels in the direction of the arrow. The belts 18 are shown as supported by rollers 46 and 47 mounted on shafts 48 and 49 which are supported in bearings 50 and 51 secured to the bars 13 of the frame 11. The lower or return positions of the belts 18 are shown as being run over rollers 52 and 53 to raise these belts out of the way of the operators. The rollers 52 and 53 are mounted on shafts 54 and 55 which are mounted for support in bearings 56 and 57 mounted on the bar 13 of the frame 11. The belts 18 engage the lower part of the rollers 22 and turn these rollers to thereby turn the fruit on the rollers. The belts 18 are adapted to be driven by the roller 53 which is in turn driven by the shaft 49. Normally the shaft 49 is driven by a sprocket 58 mounted thereon and the sprocket 58 (see Fig. 3) which is driven by means of a sprocket chain 59 from another sprocket 60 mounted on the shaft 40.

The sprocket 60 is provided with a clutch member 61 and is adapted to be driven through the medium of another clutch member 62 from the shaft 40. The shaft 40 is driven, as previously described, by the sprocket 41 mounted thereon, the sprocket chain 42 and the sprocket 43 from the motor shaft 44.

The clutch portion 62 is shiftable and is adapted to be driven by the shaft 40 through the medium of a key 63. The clutch portion 62 is shiftable by means of a yoke 64 having inwardly extending pins 65 adapted to work in a groove 66 of the clutch portion 62. The yoke 64 is provided with an arm 67 fixed on a shaft 68 which is supported in bearings in a bracket 69. The shaft 68 is adapted to be rocked by an operating handle 70 for actuating the clutch member 62.

When the shaft 49 is driven by the sprocket 58 as previously described the belts 18 will be caused to travel at a speed approximately twice as fast as the roller conveyor. This will cause the rollers 22 to turn anti-clockwise as the conveyor 17 advances.

If it is desired to have the belts travel faster than at a two to one ratio with the conveyor 17 the shaft 49 is driven by a sprocket 71 secured thereto. This sprocket 71 is driven by means of a sprocket chain 72 from a sprocket 73 mounted on the shaft 40.

The sprocket 73 is provided with a clutch member 74, similar to the clutch member 61 of sprocket 60, which is adapted to be engaged and driven by the clutch member 62.

To insure constant contact between the conveying rollers 22 and the belts 18 we provide a plate 75 between the upper and lower reaches of the belts 18. The plate 75 is resiliently held against the under side of the working portion of the belts 18 by resilient supports 76 mounted between the belts 18 on transverse bars 77 (see Fig. 4).

From the foregoing description it will be apparent that when the roller conveyor 17 and the belts 18 are traveling in the direction of the arrow the belts 18 will cause the rollers 22 to turn in an anti-clockwise direction and that any article such as a lemon L which is resting on the rollers 22 will be turned more or less slowly in a clockwise direction.

The resilient plate supports 76 each comprise (as more clearly shown in Fig. 4) a threaded stem 78 riveted or otherwise secured to the plate 75, and projecting through an aperture 79 formed in the bar 77. This stem is provided below the under surface of the bar, with a washer 80 and lock nuts 81 and adjacent the plate 75 with a washer 82 and lock nuts 83. Arranged between the plates 75 and the washer 82 a coil spring 84 is provided which encircles the stem 78.

With this arrangement of support the plate 75 may be adjusted so that its pressure against the belts 18 is regulated by means of the nuts 81. The tension of the spring 84 is also adjustable by means of the nuts 83.

The inspection trough 21 is defined at the bottom by the rollers 22 and at the sides by side boards 85 and 86 which are supported by brackets 87 secured to the bars 13. The bottom edges of the side boards 85 and 86 are spaced just above the shafts 23 of the rollers 22. The inspection trough 21 is shown as divided into stations A, B, C, and D, by means of bridge-like partitions 87, 88, 89, 90, and 91, although other arrangements may be made if desired. The partitions extend up on one side from a guard 92 to a point above the side board 85 and have their other ends secured to upwardly extending portion 92 of the side board 85.

The stations A, B, C, D, form points at which operators work while grading the fruit or other objects on the rollers 22.

As shown in the drawings there is a platform 93 provided on which the operators stand while inspecting the fruit. The platform 93 is supported on the transverse members 16 of the frame 11 and by bars 94 secured to and supported by vertical bars 95 to the upper ends of which there is secured a longitudinally extending bar 96 to form a railing. For the disposition of the undesired fruit we have shown a chute 97 (see Fig. 2) onto which the culled fruit is thrown.

From the foregoing description it will be apparent that as the fruit is deposited upon the conveyor 17 from the loading chute 19, and is conveyed upon the rollers 22 past the stations A, B, C, and D, to the discharge chute 20, the fruit will be caused by the rollers 22 to turn, thus displaying the entire outer surface to the view of the operators. The fruit may be turned once, or only a part of a turn, or it may be turned a number of times within the limits of each station. Thus the operators at the stations A, B, C, and D, are enabled to view the full surface of the fruit as it passes their respective stations.

When an undesirable piece of fruit is observed by an operator he will remove the same from the conveyor 17 and deposit it on the chute 97.

By operating the clutch control member 70 the rate of turning of the fruit may be altered to suit conditions.

From the foregoing description it will be apparent that we have provided a novel and efficient means for causing the entire outer surface of objects to be visible while being conveyed past a number of stations.

What we claim is:

1. In a fruit grading device an endless conveyor including spaced rollers mounted for rotation, means for driving said conveyor and means for turning said rollers, means for driving said roller turning means and adjustable resilient means for positively causing said roller turning means to engage said rollers.

2. In a grading device, a conveyor comprising spaced endless chains having a plurality of spaced rollers mounted thereon, means to support said endless chains, means for causing said rollers to turn, said means comprising a belt, means to drive said belt, means for positively causing said roller turning belt to engage a portion of said rollers, said means comprising a plate engaging the under side of the working reach of said belt, said plate being held against the said under side of the working reach of said belt by adjustable supports.

3. In a device of the class described a conveyor, said conveyor comprising spaced endless chains having a plurality of spaced rollers mounted thereon, said endless chains being supported by a plurality of sprockets and adapted to be driven by one of said sprockets, a shaft on which said conveyor drive sprocket is mounted, means to drive said shaft, a belt engaging said conveyor rollers to turn them, a plurality of rollers on which said belt is mounted, means to drive one of said rollers, means for positively causing said roller turning belt to engage a portion of said conveyor rollers, said means comprising a plate engaging the under side of the working reach of said belt, said plate being held against the said under side of the working reach of said belt by supports, said supports being resilient, and said resilient plate supports being adjustably mounted.

4. In a device of the class described, a pair of endless chains, rollers mounted on said chain for rotation, means for driving said chains, a plurality of belts engaging said rollers to turn them, means for driving said belts and a resilient member engaging the under surfaces of the working reach of said belts for positively causing said belt to engage said rollers.

5. In a device of the class described, a conveyor comprising spaced endless chains having a plurality of spaced rollers mounted thereon, means to support said endless chains, means to cause said rollers to turn, said means comprising a plurality of spaced belts, means to drive said belts, means for positively causing said roller turning belts to engage said rollers, said means comprising a member engaging the under side of the working reach of each of said belts, said member being held against the under side of the working reach of said belt by resilient supports and said resilient supports being adjustable to vary the bearing tension against said belts.

6. In a fruit grading device, a conveyor, said conveyor comprising spaced endless chains having a plurality of spaced rollers thereon, said endless chains being supported by a plurality of sprockets and adapted to be driven by one of said sprockets, a shaft on which said conveyor drive sprocket is mounted, said shaft being driven by a second sprocket mounted thereon, means to drive said last mentioned sprocket, means for causing said conveyor rollers to turn, said means comprising a belt adapted to engage the under side of a portion of said rollers, said belt being supported by a plurality of spaced rollers and adapted to be driven by one of said last mentioned rollers, a shaft on which said belt drive roller is mounted, said shaft being driven by a sprocket mounted thereon, another shaft, means on said last mentioned shaft for driving said conveyor driving means and said belt driving means, said last mentioned means on said shaft including change speed mechanism whereby the rate of drive of the conveyor and the belt may be relatively varied and means to drive said shaft.

7. In a grading device, a conveyor comprising a pair of spaced endless chains connected by a plurality of roller members, means to support said endless chains, means to drive said conveyor, a plate having a plane upper surface disposed beneath and parallel to the working reach of said conveyor, a belt supported on and movable over the plane surface of said plate, said belt engaging the under surface of the rollers which are in working position to thereby turn said rollers and means to support said belt.

In testimony whereof, we hereunto affix our singnatures.

FRANK B. ROBERTS.
WILLIS G. HUNTINGTON.